No. 651,240. Patented June 5, 1900.
J. I. DE WITT.
PLOW.
(Application filed Mar. 28, 1900.)
(No Model.) 2 Sheets—Sheet I.

Witnesses:

Inventor
John I. DeWitt
By James L. Norris
Atty

THE NORRIS PETERS CO., PHOTO-LITHO., WASHINGTON, D. C.

No. 651,240. Patented June 5, 1900.
J. I. DE WITT.
PLOW.
(Application filed Mar. 28, 1900.)
(No Model.) 2 Sheets—Sheet 2.
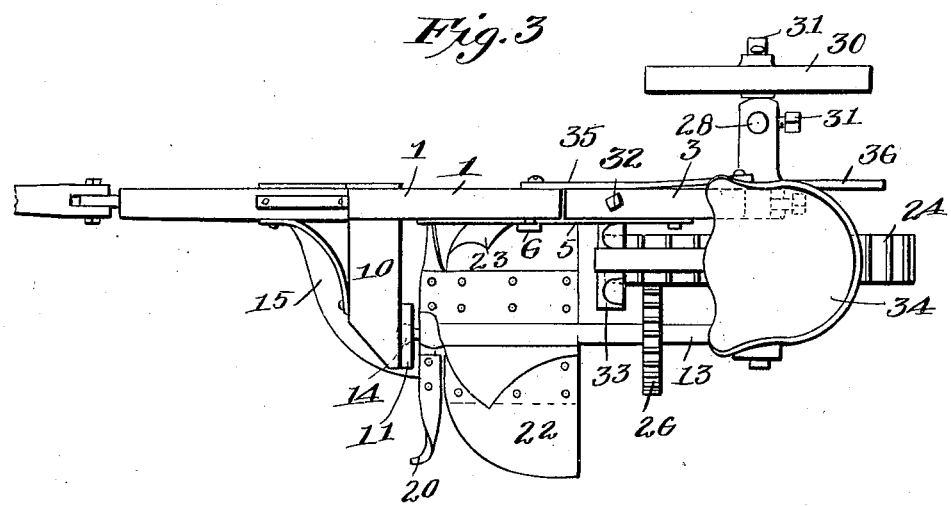
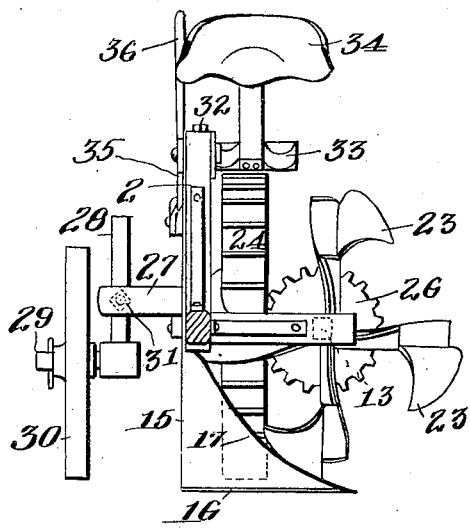
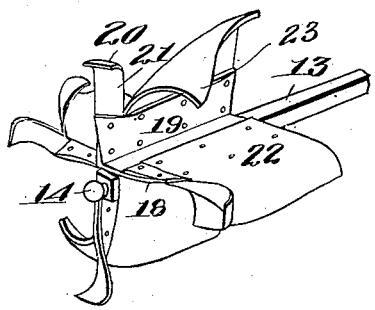
Witnesses:
Inventor
John I. DeWitt
By James L. Norris
Atty.

UNITED STATES PATENT OFFICE.

JOHN I. DE WITT, OF BLUFFTON, INDIANA.

PLOW.

SPECIFICATION forming part of Letters Patent No. 651,240, dated June 5, 1900.

Application filed March 28, 1900. Serial No. 10,500. (No model.)

*To all whom it may concern:*

Be it known that I, JOHN I. DE WITT, a citizen of the United States, residing at Bluffton, in the county of Wells and State of Indiana, have invented new and useful Improvements in Plows, of which the following is a specification.

This invention relates to plows, and has for one object to provide improved means for automatically throwing the plowed earth to one side of the furrow and for thoroughly pulverizing and spreading it out.

It has for its further object to combine with such an arrangement improved means for cutting up the soil and breaking up the clods after the earth has been plowed up and before it is pulverized and thrown to one side.

It also has for its object to provide improved means under the control of the operator for releasing or disengaging the plow should the latter become wedged or stuck in the soil.

To these ends my invention consists in the features and in the construction, combination, or arrangement of parts hereinafter described, and particularly pointed out in the claims, reference being had to the accompanying drawings, forming a part of this specification, wherein—

Figure 1:
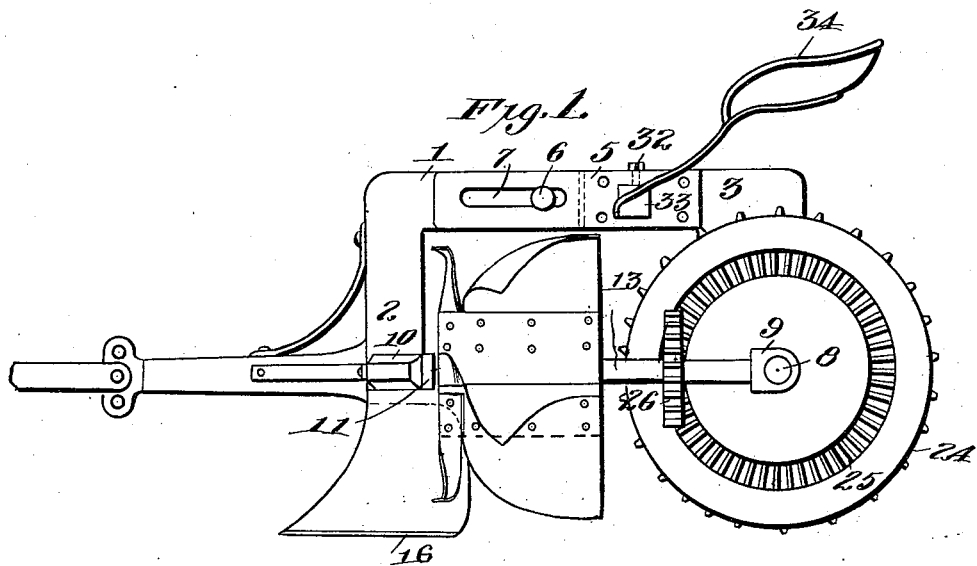
Figure 2:
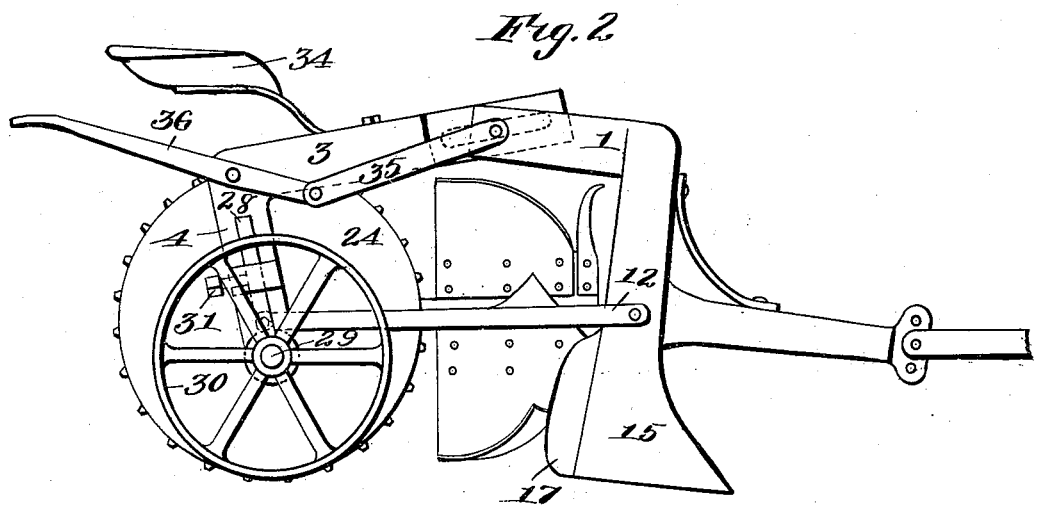

Figure 1 is a side elevation of my improved plow viewed from one side. Fig. 2 is a similar view looking from the other side. Fig. 3 is a top plan view. Fig. 4 is a front end view, and Fig. 5 is a detail view of the rotary sweep and cutters and breakers detached from the plow.

The frame of my improved plow comprises a sectional beam, the forward portion 1 of which is provided at its forward end with a vertical standard 2, and the rear portion 3 of said beam is provided at its rear end with a downwardly-extending upright 4. The adjacent ends of the two beams 1 and 3 are jointed together by a plate 5, which is rigidly attached to one side of one of the beams, as 3, and is connected to the adjacent end of the other beam by a bolt or pin 6, that projects through a slot 7, formed in said plate. Projecting laterally from one side of the lower end of the upright 4 is a horizontal rigid shaft 8, on one end of which is fixed a bearing 9, and projecting from the corresponding side of the standard 2 is a horizontal bracket-arm 10, on which is fixed a journal box or bearing 11. The lower ends of the standard 2 and upright 4 are connected by a brace-rod 12, one end of which is fixed to the upright and the other end is pivotally attached to the standard. In the bearings 9 and 11 are journaled the ends of a shaft 13, for the purpose hereinafter described, the forward end of the shaft being preferably provided with an integral ball 14, which is journaled in the box 11, thereby forming a universal joint or bearing. Rigidly attached to the standard 2 is the plow, comprising the cutter 15, share 16, and moldboard 17, of ordinary construction, excepting that the share and moldboard are preferably made wider than usual. Projecting radially from the shaft 13 are two sets or series of webs or ribs 18 and 19, which may either be formed integral with the shaft or firmly attached thereto in any suitable manner. Bolted or otherwise suitably attached to the ribs 18 are radial cutters or breakers 20, consisting of metallic strips or blades, which are given a slight torsional twist and at their outer ends are curved or bent forward, as shown. The forward edges 21 of the blades 20 are preferably beveled or sharpened to form cutting edges. The outer curved ends of the blades 20 are shaped to correspond to the curvature of the moldboard of the plow and are so arranged that when the cutters or breakers are rotated their curved ends travel in close proximity to the face of the moldboard, nearly touching the latter, whereby they act as scrapers to take the earth directly from the moldboard and keep the latter clear. Bolted or otherwise suitably attached to the ribs or webs 20 are sweeps 22, each consisting of a rectangular blade or plate which projects radially from the rib or web to which it is attached. The outer ends of the sweeps 22 are bent or curved backward—that is to say, are curved laterally in a direction opposite to that in which they rotate—said curvature gradually increasing from the rear to the forward edges of the sweeps, or, in other words, the outer portion of the sweep is gradually deflected more and more from a flat radial plane as its forward edge is approached, the outer and forward edge or corner 23 of the sweep being curved or rolled backward or inward, as shown and for the purpose hereinafter explained.

Journaled on the shaft is a traction furrow-wheel 24, formed on or attached to the outer face of which is beveled gear-wheel 25, and gearing with said gear-wheel is a beveled pinion 26, which is fixed on the shaft 13. Projecting horizontally from the upright 4, on the side opposite the shaft 8, is a bracket-arm 27, in which is adjustably fixed a vertical arm 28, provided at its lower end with an axle-spindle 29, on which is journaled a ground-wheel 30. The vertically-adjustable arm 28 is held in its adjusted position by a set-screw 31 or by equivalent well-known means. In practice the traction-wheel 24 runs in the furrow behind the plow, while the ground-wheel travels on the unplowed ground, and by adjusting the arm 28 the ground-wheel may be set at the proper height relatively to the traction-wheel, as the depth of the furrow being plowed may render necessary.

Fitted in the beam 3 and held therein by a set-screw 32 is a laterally-projecting arm 33, on which is fixed a driver's seat 34.

The adjacent ends of the beams 1 and 3 are detachably coupled together in the manner before described, and the beam 1, together with the standard 2 and the plow carried by the latter, is free to turn or dip forward on the bearing 11 and the pivotal attachment of the brace-rod 12 as centers to permit of the downward inclination of the plow. A link 35 is pivoted at one end to the rear end of the beam 1 and at its other end is pivotally connected to a hand-lever 36, which latter is pivoted intermediate its end to the rear end of the beam 3 and at its free end projects into convenient reaching distance from the driver's seat.

The operation of my improved plow is as follows: Suitable draft apparatus, of any preferred or approved construction, is attached to the standard 2, by means of which the draft-animals draw the plow over the field to be plowed. The plow operates to open the ground and turn the soil from the landside in the usual manner. As before stated, the traction-wheel 24 travels behind the plow in the furrow made by the latter, and as it rotates it communicates its movement to the shaft 13 through the medium of the described gearing and rotates the cutter and breaker blades 20 and the rotary sweep 22 in the direction indicated by the arrow. As the earth is about to leave the near edge of the moldboard the rotary cutters or breakers 20 operate to cut it up and break up the clods, the curved ends of the blades operating as scrapers to clear off the face of the moldboard and prevent the soil from caking therein or sticking thereto. The earth immediately after having been cut and broken up by the rotary cutter and breaker is engaged by the rotary sweeps, which operate to thoroughly pulverize the soil and turn it over and mix it and at the same time push it laterally out of the furrow and thrust it to one side. Owing to the peculiar shape of the sweeps as described they engage the soil and thrust it to one side gradually—that is to say, the forward rolled or curved edges of the sweeps enter the earth or soil easily and pulverize it, and as the rear edge of the sweeper-blade is approached it sinks deeper and deeper into the soil and pushes it to one side, and as the sweeps start to lift out of the soil the latter glides off the rolled or curved edges of the sweeps smoothly and with but little friction, offering but little resistance to the rotation of the sweeps and preventing the soil from being lifted up with the latter.

By jointing the plow-frame in the manner described the forward portion thereof, carrying the plow, drops or dips down by gravity, giving to the plow the proper inclination to enter the ground and plow up the earth; but if from any cause the plow should stick or become wedged it is only necessary for the operator to pull upon the lever 36, thus drawing the adjacent ends of the beams 1 and 3 together and lifting up the point of the plow, so that it will leave the earth or lightly skim over it.

I have shown the plow arranged as a riding-plow; but by making the driver's seat detachable, as described, the plow can be quickly converted into a walking-plow by removing the seat and substituting the usual plow-handles.

Having described my invention, what I claim is—

1. In a plow, the combination with the plow-frame and a plow carried thereby, of a rotary sweep arranged in the rear of the plow and provided with a series of radial blades arranged to pulverize the plowed soil and thrust it laterally out of and to one side of the furrow, and mechanism actuated by the forward movement of the plow for rotating said sweep, substantially as described.

2. In a plow, the combination with the plow-frame and a plow carried thereby, of a rotary sweep arranged in rear of the plow-moldboard and provided with a series of radial blades arranged to pulverize the plowed soil and thrust it laterally out of and to one side of the furrow, mechanism actuated by the forward movement of the plow for rotating the sweep, and radial cutters and breakers fixed on the axis of the rotary sweep in front of the latter and operating to cut and break up the earth as it leaves the plow-moldboard and before it is acted on by said sweep, substantially as described.

3. In a plow, the combination with the plow-frame and a plow carried thereby, of a rotary sweep arranged in the rear of the plow and provided with a series of radial blades each rolled or curved laterally to one side at its outer edge from its front toward its rear, and mechanism actuated by the forward movement of the plow for rotating said sweep, whereby the latter operates to pulverize the soil and thrust it out of and to one side of the furrow, substantially as described.

4. In a plow, the combination with the plow-frame and a plow carried thereby, of a rotary sweep arranged in rear of the plow-moldboard and provided with a series of radial blades each curved at its outer edge laterally to one side in a direction opposite to that in which the sweep is arranged to rotate, said curvature increasing from the rear to the forward edges of the blades, and mechanism actuated by the forward movement of the plow for rotating said sweep, substantially as described.

5. In a plow, the combination with the plow-frame and a plow carried thereby, of a shaft rotatably mounted in rear of the plow and parallel with the line of draft, radial, sweeps carried by the shaft and each comprising a rectangular blade curved at its outer edge laterally to one side in a direction opposite to that in which the sweep is arranged to rotate, the curvature gradually increasing from the rear to the forward edge of the blade, a furrow-wheel journaled on the rear end of the plow-frame and gearing connecting said wheel and shaft and operating to rotate the latter to cause the sweeps to thrust the soil laterally out of and to one side of the furrow, substantially as described.

6. In a plow, the combination with the plow-frame and a plow carried thereby, of a shaft rotatably mounted in rear of the plow and parallel with the line of draft, radial ribs carried by the shaft, sweeps attached to said ribs and each comprising a rectangular blade curved at its outer edge laterally to one side in a direction opposite to that in which the sweep is arranged to rotate, the curvature gradually increasing from the rear to the forward edge of the blade, a furrow-wheel journaled in the rear end of the plow-frame, and gearing connecting said wheels and draft and operating to rotate the latter to cause the sweeps to thrust the soil laterally out of and to one side of the furrow, substantially as described.

7. In a plow, the combination with the plow-frame, and a plow carried thereby, of a shaft rotatably mounted in rear of the plow and parallel with the line of draft, radial ribs carried by the shaft, cutters and breakers attached to said ribs and each comprising a flat metallic strip or blade bent torsionally and curved forward at its outer end, said cutters and breakers being arranged to rotate in close proximity to the rear edge of the moldboard of the plow, and mechanism actuated by the forward movement of the plow for rotating the said shaft, substantially as described.

8. In a plow, the combination with the plow-frame and a plow carried thereby, of a shaft rotatably mounted in rear of the plow and parallel with the line of draft, radial ribs carried by the shaft, cutters and breakers attached to said ribs and each comprising a flat metallic strip or blade bent torsionally and curved forward at its outer end, said blades being provided with cutting edges, said cutters and breakers being arranged to rotate at their outer curved ends in close proximity to and parallel with the rear edge of the moldboard of the plow, and mechanism actuated by the forward movement of the plow for rotating the said shaft, substantially as described.

9. In a plow, the combination with a frame comprising two plow-beams arranged end to end and loosely coupled together at their adjacent ends, of a plow carried by the forward beam, ground-wheels carried by the rear beam, a link pivoted at its forward end to the rear end of the forward beam, and a hand-lever pivoted at one end to the rear end of the rear beam and intermediate its ends to the rear of said links, substantially as described.

In testimony whereof I have hereunto set my hand in presence of two subscribing witnesses.

JOHN I. DE WITT.

Witnesses:
W. S. BRICKER,
JOHN K. RINEHART.